(12) United States Patent
Horn et al.

(10) Patent No.: US 11,293,470 B2
(45) Date of Patent: Apr. 5, 2022

(54) ARRANGEMENT OF AN ANCHOR IN AN ANCHORING HOLE, AND FIXING SYSTEM

(71) Applicant: Fischerwerke GmbH & Co. KG, Waldachtal (DE)

(72) Inventors: Sebastian Horn, Eutingen i.G. (DE); Johann Schwab, Nagold (DE)

(73) Assignee: fischerwerke GmbH & Co. KG, Waldachtal (DE)

( * ) Notice: Subject to any disclaimer, the term of this patent is extended or adjusted under 35 U.S.C. 154(b) by 275 days.

(21) Appl. No.: 16/494,365

(22) PCT Filed: Mar. 1, 2018

(86) PCT No.: PCT/EP2018/055002
§ 371 (c)(1),
(2) Date: Sep. 16, 2019

(87) PCT Pub. No.: WO2018/177675
PCT Pub. Date: Oct. 4, 2018

(65) Prior Publication Data
US 2020/0049184 A1 Feb. 13, 2020

(30) Foreign Application Priority Data
Mar. 27, 2017 (DE) ...................... 10 2017 106 485.0

(51) Int. Cl.
*F16B 13/12* (2006.01)
*F16B 13/08* (2006.01)
(Continued)

(52) U.S. Cl.
CPC ............ *F16B 13/124* (2013.01); *F16B 13/08* (2013.01); *F16B 13/141* (2013.01); *H02G 3/30* (2013.01)

(58) Field of Classification Search
CPC ........ F16B 13/124; F16B 13/08; F16B 13/04; F16B 13/141; F16B 31/02; G01B 7/14;
(Continued)

(56) References Cited

U.S. PATENT DOCUMENTS 3,885,423 A * 5/1975 Schuermann ............. E02D 1/08
73/784
4,149,350 A * 4/1979 Fischer .................. F16B 13/141
52/704
(Continued)

FOREIGN PATENT DOCUMENTS

| DE | 100 30 099 A1 | 1/2002 |
|----|---------------|--------|
| EP | 0 605 811 A1  | 7/1994 |

(Continued)

OTHER PUBLICATIONS

International Search Report for corresponding Application No. PCT/EP2018/055002, dated May 7, 2018.
(Continued)

*Primary Examiner* — Gary W Estremsky
(74) *Attorney, Agent, or Firm* — Renner, Otto, Boisselle & Sklar, LLP

(57) ABSTRACT

An anchor for an anchoring with, for example, a synthetic resin mortar in an anchoring hole in an anchoring substrate made, for example, of stone, concrete or masonry. In order that a displacement of the anchor in the direction of a mouth of the hole and, as a result, potential failure of the anchoring can be ascertained at an early stage, a cap as position sensor holder having an electrical counter-contact, which cap is mounted on the anchor. If the anchor becomes displaced, the counter-contact moves out of contact with the anchor, with the result that the displacement can be ascertained.

12 Claims, 3 Drawing Sheets

(51) Int. Cl.
*F16B 13/14* (2006.01)
*H02G 3/30* (2006.01)

(58) Field of Classification Search
CPC .. G01B 7/26; G01B 21/16; A61H 2201/5092; E02D 2600/10; E02D 2600/20
See application file for complete search history.

(56) References Cited

U.S. PATENT DOCUMENTS

| | | | | |
|---|---|---|---|---|
| 4,632,352 A * | 12/1986 | Stoll | ................ | G01D 11/30 248/313 |
| 4,642,964 A * | 2/1987 | Kellison | ................ | E04B 1/4121 52/699 |
| 4,840,524 A * | 6/1989 | Bisping | ................ | F16B 13/141 411/82 |
| 5,490,365 A * | 2/1996 | Roth | ................ | F16B 11/006 405/259.5 |
| 5,545,987 A * | 8/1996 | Schutt | ................ | E02D 5/80 324/219 |
| 5,730,565 A * | 3/1998 | Hein | ................ | F16B 13/141 411/82 |
| 5,806,275 A * | 9/1998 | Giannuzzi | ................ | C09J 9/005 405/259.5 |
| 6,393,795 B1 * | 5/2002 | Irwin | ................ | F16B 13/141 411/82.1 |
| 2004/0025596 A1 | 2/2004 | Tegtmeier | | |
| 2008/0085169 A1 * | 4/2008 | Gruen | ................ | F16B 13/141 411/44 |
| 2010/0021259 A1 * | 1/2010 | Bianchi | ................ | F16B 13/025 411/54 |
| 2010/0122448 A1 * | 5/2010 | Slepecki | ................ | F16B 13/122 29/525.01 |
| 2014/0345110 A1 * | 11/2014 | Schmidt | ................ | F16B 13/004 29/450 |
| 2019/0194878 A1 * | 6/2019 | Hamilton | ................ | E01B 29/32 |
| 2020/0049184 A1 * | 2/2020 | Horn | ................ | F16B 13/08 |

FOREIGN PATENT DOCUMENTS

| | | |
|---|---|---|
| EP | 2 141 480 A2 | 1/2010 |
| EP | 2 809 956 B1 | 1/2016 |
| WO | 2015/110201 A1 | 7/2015 |

OTHER PUBLICATIONS

Search Report for corresponding German Application No. 10 2017 106 489.3, dated Nov. 15, 2017.
Written Opinion for corresponding Application No. PCT/EP2018/055002, dated May 7, 2018.
International Preliminary Report on Patentability for corresponding Application No. PCT/EP2018/055002, dated Oct. 10, 2019.

* cited by examiner

ARRANGEMENT OF AN ANCHOR IN AN ANCHORING HOLE, AND FIXING SYSTEM

TECHNICAL FIELD OF THE INVENTION

The invention relates to an arrangement of an anchor in an anchoring hole.

An anchor in the context of the invention is a component for a fixing in an anchoring hole in an anchoring substrate made, for example, of stone, concrete or masonry. The fixing is also referred to as an anchoring. The anchoring hole can be drilled, produced in some other way or present from the outset. The anchoring hole can be, for example, cylindrical, and can also have an undercut, for example a conical or stepped undercut; it can also have an irregular shape. The anchor can be anchored in the anchoring hole, for example, mechanically by expansion or chemically with a curing or cured composition, for example a mortar, including a synthetic resin mortar. Mechanical anchoring means force-based and/or interlocking engagement in the anchoring hole, with interlocking engagement typically being effected in an undercut of the anchoring hole. Chemical anchoring means a bonded connection and in many cases additionally interlocking engagement; force-based engagement is not excluded. The explanations given in this paragraph are by way of example and serve to illustrate possibilities; they are not exhaustive.

DISCUSSION OF RELATED ART

European Patent EP 2 809 956 B1 discloses an undercut anchor having an expansion sleeve which is displaceable on an anchor shank having an expander head. By drawing the expander head into the anchor sleeve or by pushing the anchor sleeve onto the expander head, the expansion sleeve is expanded and the undercut anchor is mechanically anchored in an anchoring hole. To detect correct expansion, the anchor shank has a marker which must be located at an end of the anchor sleeve after expansion. An optical sensor device is provided for detection.

International patent application WO 2015/110201 A1 discloses an expansible fixing plug which is expansible by screwing in an expander screw. In the expansible fixing plug there is arranged a measured variable sensor which inductively detects a pressing force of a deformation element of the expansible fixing plug against a wall of an anchoring hole.

The problem of the invention is to propose a possible method by which a displacement of an anchor anchored in an anchoring hole can be detected. In particular, a movement of the anchor in the direction out of the anchoring hole is to be detected, such movement in practice relating to movements in the millimetre range or smaller which can point to failure long before the anchoring fails.

SUMMARY OF THE INVENTION

That problem is solved according to the invention by an arrangement and fixing system as described herein. The arrangement according to the invention has an anchoring hole in an anchoring substrate and an anchor arranged, especially anchored, in the anchoring hole. In addition, in the anchoring hole there is arranged an electrical, for example ohmic, inductive or capacitive, position sensor. The position sensor is arranged in the anchoring hole in such a way that the anchor moves relative to the position sensor if the anchor moves in a direction out of the anchoring hole. As a result, a displacement of the anchor anchored in the anchoring hole and potential failure of the anchoring can be detected at an early stage. In particular, the anchor is arranged fixedly in the anchoring hole so that solely the anchor moves relative to the anchoring hole.

Preferably the position sensor is arranged in the anchoring hole at an end of the anchor that is located in the anchoring hole. "At" also includes an arrangement of the position sensor close to or before the end of the anchor, with "close" meaning, for example, within one millimetre or a few millimetres or less than 1 mm. On the one hand, the position sensor can readily be accommodated in the anchoring hole at or before that end of the anchor which is located in the anchoring hole and introduced into the anchoring hole with the anchor at the intended location and, on the other hand, potential failure of the anchoring can be readily identified if a displacement of the anchor in the anchoring hole is detected at a spacing preferably of a plurality of anchor diameters from the mouth of a hole, that is to say, for example, at that end of the anchor which is located in the anchoring hole.

An embodiment of the invention provides a chemical anchoring of the anchor and a chemical fixing of the position sensor in the anchoring hole. "Chemical anchoring" and "fixing" denote a fixing with a cured composition, for example a mortar, including a synthetic resin mortar, an adhesive or a synthetic resin. Such an embodiment allows simple implementation and handling of the invention: it is necessary merely to introduce the curing composition and the position sensor into the anchoring hole with the anchor.

A preferred embodiment of the invention provides a position sensor holder which holds the position sensor in the anchoring hole movably or releasably on the anchor and/or against movement together with the anchor in the direction out of the anchoring hole. In the case of a chemical anchoring, the position sensor holder can be fixed in the anchoring hole with the cured composition with which the anchor is anchored in the anchoring hole. The position sensor holder enables the position sensor to be introduced into the anchoring hole with the anchor. In the anchoring hole, the position sensor holder holds the position sensor so that it does not move together with the anchor if the anchor moves in a direction out of the anchoring hole. Such an embodiment of the invention allows simple handling of the position sensor with the anchor.

An embodiment of the invention provides that the anchor has an electrical contact and the position sensor has an electrical counter-contact. The anchor itself can form the electrical contact if it is electrically conducting, for example a metal rod. In the event of a movement of the anchor in the direction out of the anchoring hole, the contact moves into or out of electrically conducting contact with the counter-contact, with the result that an electrical circuit is closed or broken, so that the movement of the anchor in the anchoring hole can be ascertained.

A development of the invention provides a plurality of electrical counter-contacts of the position sensor which are arranged one after the other in a longitudinal direction of the anchoring hole. As a result, not only can the fact of a movement of the anchor in the anchoring hole be ascertained, but also a path, i.e. the distance travelled, of the anchor in the direction out of the anchoring hole. It is thereby possible to identify whether the anchor has become displaced in the anchoring hole within an admissible tolerance or whether the displacement is so great that the anchoring is likely to fail.

A further embodiment of the invention provides that the anchor has a part of a capacitor and the position sensor has another part of a capacitor. The anchor itself can form one part of the capacitor or, for example, the anchor has a capacitor plate or the like which is electrically insulated from the anchor if the anchor is electrically conducting. In the event of a movement of the anchor in the anchoring hole, a spacing between the part of the capacitor on the anchor and the other part of the capacitor on the position sensor changes, so that the capacitance of the capacitor changes, with the result that the movement of the anchor in the anchoring hole can be measured.

The position sensor holder can have, for example, a cap which is mountable on an end of the anchor. In particular, the cap seals the part of the anchor on which one or more counter-contacts or a part of the capacitor are arranged and/or seals the position sensor against penetration of a curable composition during insertion of the anchor into the anchoring hole.

Preferably the position sensor holder projects radially beyond the anchor, or has holding elements, counter-bearings or the like that project radially beyond the anchor, for holding the position sensor holder in an anchoring hole, so that the position sensor holder is held in the anchoring hole until a curing composition has cured and holds the anchor and the position sensor holder in the anchoring hole. In the case of a mechanical anchoring, the position sensor holder is held in the anchoring hole mechanically, without a bonded connection, as a result of its being over-sized or as a result of its holding elements being over-sized relative to the anchor and preferably also relative to the anchoring hole.

BRIEF DESCRIPTION OF THE DRAWINGS

The invention is explained in greater detail below with reference to exemplary embodiments shown in the drawing, wherein.

DETAILED DESCRIPTION OF THE INVENTION

Figure 1:
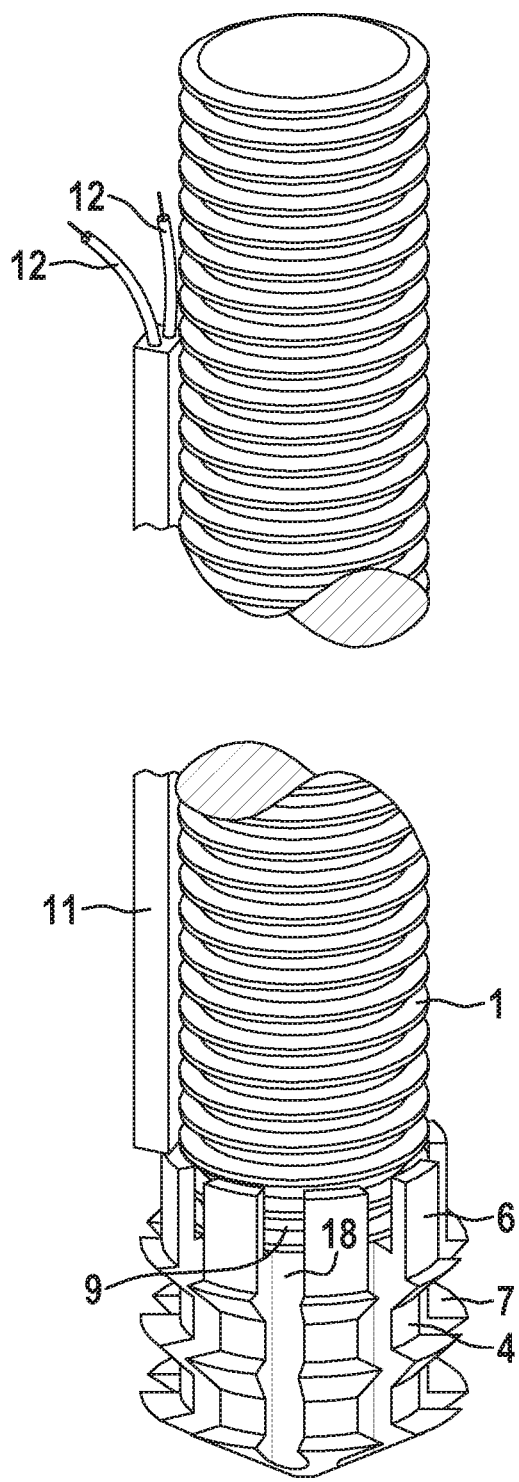
FIG. 1 shows a first fixing system according to the invention.
Figure 3:
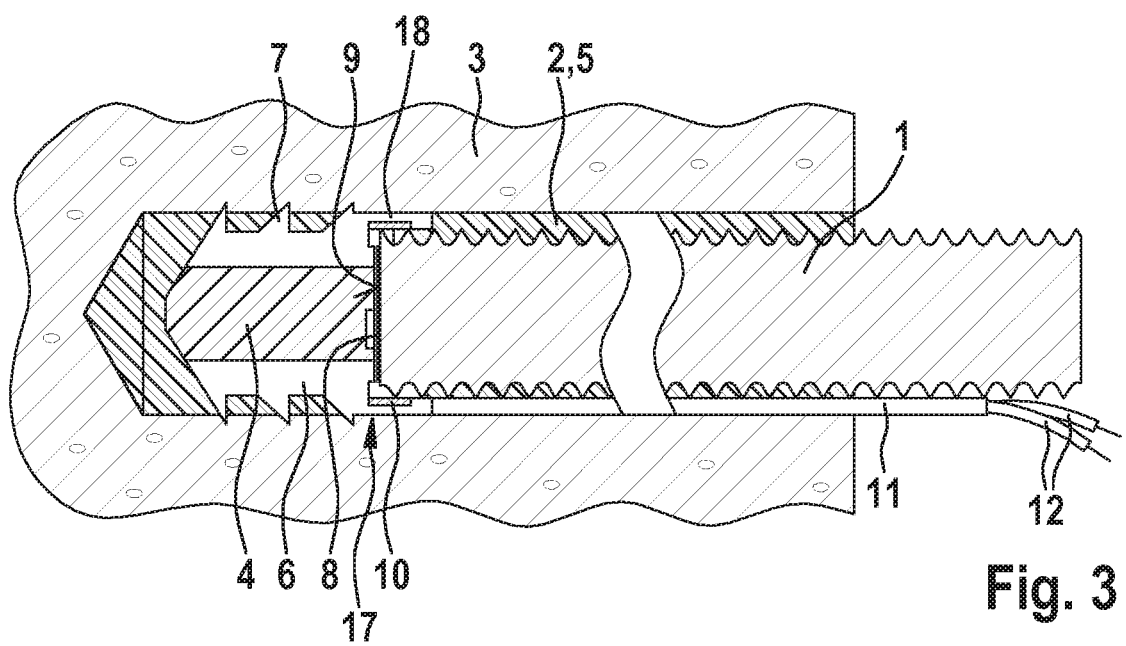
FIG. 3 shows an arrangement of the anchor with the position sensor holder in an anchoring hole in an anchoring substrate according to the invention.

FIG. 1 shows a fixing system according to the invention having an anchor 1 which is intended for an anchoring in an anchoring hole 2 in an anchoring substrate 3 as shown in FIG. 3, having a position sensor holder 4 and a position sensor 17. The anchor 1 is a threaded rod which is intended for a chemical anchoring, that is to say a fixing with a curing or cured composition 5. The curing or cured composition 5 is, for example, a cement mortar or synthetic resin mortar. The position sensor holder 4 has a cap 18 which is mounted on an end of the anchor 1. In the exemplary embodiment the position sensor holder 4 is made of a plastics and has in its periphery longitudinal slots by means of which radially resilient holding elements 6 are formed that hold the position sensor holder 4 on the end of the anchor 1. The holding elements 6 have sawtooth-shaped barbs 7 which project radially beyond the anchor 1. In the undeformed state, the barbs 7 of the holding elements 6 also project radially beyond a wall of the anchoring hole 2 so that the barbs 7 hold the position sensor holder 4 in the anchoring hole 2.

Figure 2:
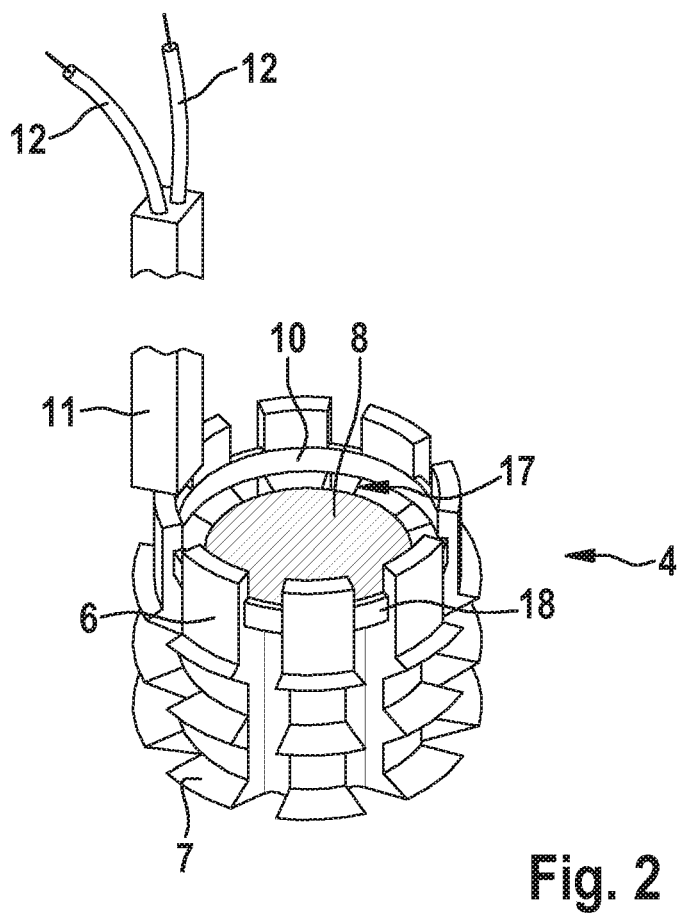
FIG. 2 shows the position sensor holder from FIG. 1.

The position sensor holder 4 has a metal disc, a metallised surface or some other, electrically conducting element as position sensor 17 which forms an electrically conducting counter-contact 8 for the anchor 1 and can be seen in FIGS. 2 and 3. In the exemplary embodiment the anchor 1 is made of metal and its end face forms a contact 9 which is in electrically conducting contact with the counter-contact 8 of the position sensor holder 4 when the position sensor holder 4 is mounted as intended on the end of the anchor 1, so that the end face of the anchor 1 touches the counter-contact 8 in the position sensor holder 4. If the anchor 1 is not made of an electrically conducting material it can also have a disc or some other electrically conducting element on its end face or a metallised end face which forms the contact 9.

The position sensor 17, apart from comprising the counter-contact 8 in the form of a metal disc, also comprises as further counter-contact 10 a metal ring which encompasses the anchor 1 and is in electrically conducting contact with the anchor 1 when the position sensor holder 4 has been mounted as intended on one end of the anchor 1. The anchor 1 also forms an electrically conducting contact 9 for the further counter-contact 10.

One of the holding elements 6 of the position sensor holder 4 has an extension which runs axially parallel along a periphery of the anchor 1 when the position sensor holder 4 has been positioned as intended on one end of the anchor 1. The extension forms a cable channel 11 in which cables 12 run alongside the anchor 1, which cables are in electrically conducting connection with the counter-contacts 8, 10 of the position sensor holder 4 and are insulated from the anchor 1.

For an anchoring, that is to say fixing of the anchor 1 in the anchoring hole 2 in the anchoring substrate 3, the curing composition 5 and then the anchor 1 with the position sensor holder 4 mounted on its own end are introduced into the anchoring hole 2 so that the position sensor holder 4 is located at an end of the anchor 1 that is at the front in a direction of introduction. The anchoring hole 2 has, for example, been drilled or created in some other way or is already present. The anchoring substrate 3 is made, for example, of stone, concrete or masonry. On introduction of the anchor 1, the curing composition 5 is displaced from a base of the hole in the direction of a mouth of the hole into an annular gap between the position sensor holder 4 and the anchor 1 on the one hand and a wall of the anchoring hole 2 on the other hand, so that the curing composition 5 fills the annular gap surrounding the position sensor holder 4 and the anchor 1 in the anchoring hole 2. The cap 18 prevents the composition 5 from reaching the position sensor 17. After curing of the curing composition 5, which is then referred to as the cured composition 5, the position sensor holder 4 and the anchor 1 are fixed in position, that is to say anchored, in the anchoring hole 2 in the anchoring substrate 3 by a bonded connection and by interlocking engagement. The cable channel 11 runs in the annular gap between the anchor 1 and the anchoring hole 2 out of the mouth of the hole, where the cables 12 can be contacted.

If, on being subjected to axial tensile stress in a direction opposite to the direction of introduction, the anchor 1 anchored in the anchoring hole 2 becomes displaced in a pull-out direction, that is to say in a direction out of the anchoring hole 2, away from the base of the hole in the direction of the mouth of the hole, first of all the contact 9 of the anchor 1 moves out of contact with the counter-contact 8 of the position sensor 17, with the result that the displacement of the anchor 1 can be ascertained. If the anchor 1 becomes displaced further in the direction of the mouth of the hole, the contact 9 of the anchor 1 also moves out of contact with the further counter-contact 10 of the position sensor 17. In the exemplary embodiment, the contact 9 of the anchor 1 moves out of contact with the further counter-contact 10 on displacement of the anchor 1 by 0.8 mm or more. In the exemplary embodiment, the threaded rod forming the anchor 1 has an M12 size thread. In the exemplary embodiment, a displacement of the anchor 1 in the direction of the mouth of the anchoring hole 2 by up to 0.8 mm is regarded as being within permissible tolerance, but a greater displacement is not permissible and requires safety measures, for example the setting of one or more replacement anchors. Adherence to or exceeding of the permissible tolerance of the displacement of the anchor 1 in the direction of the mouth of the anchoring hole 2 can be ascertained by the being-in-electrically-conducting-contact or moving-out-of-electrically-conducting-contact of the contact 9 of the anchor 1 with the further counter-contact 10 of the position sensor holder 4 at the cables 12 outside the anchoring substrate 3.

The anchor 1 as electrical contact 9 and the two counter-contacts 8, 10 form two electrical position sensors which are arranged one after the other in a longitudinal direction of the anchoring hole 2. The position sensor holder 4 and the counter-contacts 8, 10 arranged therein are firmly anchored in the anchoring hole 2 by the cured composition 5 and do not move together with the anchor 1 if the latter becomes displaced in the direction of the mouth of the hole, with the result that the displacement of the anchor 1 in relation to the anchoring substrate 3 can be ascertained.

In the undeformed state of the position sensor holder 4 outside the anchoring hole 1, the barbs 7 of the holding element 6 are located on a larger diameter than a diameter of the anchoring hole 2 or a nominal diameter of such an anchoring hole 2 assigned to the anchor 1, so that the barbs 7 of the holding elements 6 press under tension against the wall of the anchoring hole 2 when the position sensor holder 4 is located in the anchoring hole 2. The position sensor holder 4 is therefore held in an anchoring hole 2 even without curing composition 5 if a hole diameter is not greater than the diameter on which the barbs 7 of the holding elements 6 of the position sensor holder 4 are located. The position sensor holder 4 can therefore also be used with an anchor, for example an expansible anchor, that is mechanically anchored, for example by expansion, in an anchoring hole without curing composition (not shown). Preferably such an anchor and the position sensor holder 4 are configured so that the position sensor holder 4 is mountable on the end of the anchor or releasably attachable in some other way to the end of the anchor which is at the front when the anchor is introduced into the anchoring hole. The releasable connection between the position sensor holder 4 and the anchor is weaker than a hold of the position sensor holder 4 with its barbs 7 pressing against the hole wall in the anchoring hole 2, so that the position sensor holder 4 does not move together with the anchor if the latter becomes displaced in the direction of the mouth of the hole.

Figure 4:
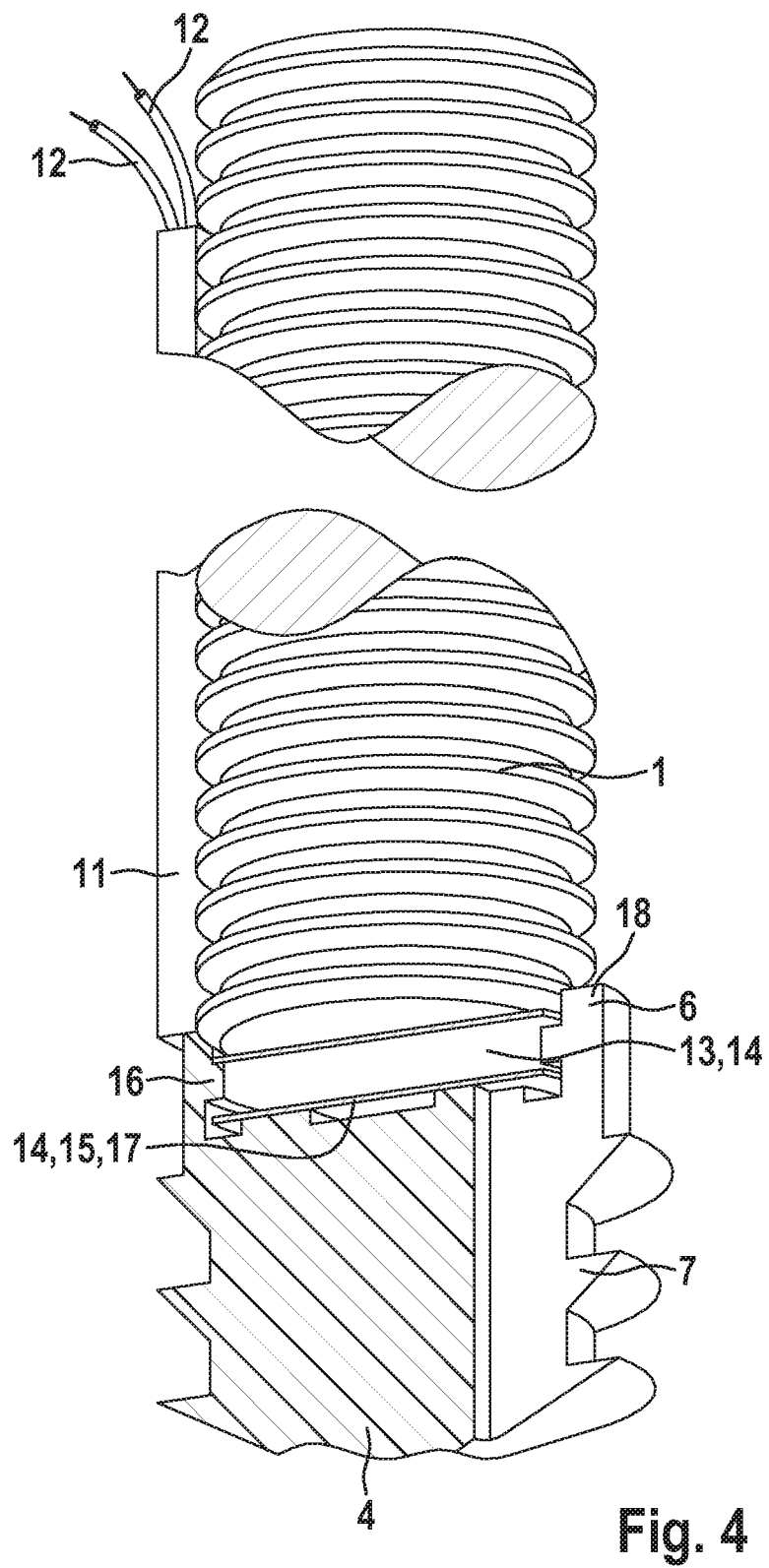
FIG. 4 shows a second exemplary embodiment of a fixing system according to the invention.

In FIG. 4 the anchor 1 is likewise a threaded rod and the position sensor holder 4 is configured in the same way as described in connection with FIGS. 1 to 3 except that it does not have a metal ring as further counter-contact 10. The anchor 1 from FIG. 4 has on its end face a metal disc as a part 13 of a capacitor 14 and the position sensor holder 4 has a metal disc which is arranged in a radial plane and in this implementation of the invention forms another part 15 of the capacitor 14. The metal disc forming the first part 13 of the capacitor 14 is electrically insulated from the anchor 1 if the anchor 1 is made of metal or some other electrically conducting material. The other, second part 15 of the capacitor 14 arranged on the position sensor holder 4 forms the position sensor 17 which serves as position reference. The position sensor holder 4 has a circumferential, inwardly projecting collar as stop 16 for the anchor 1, which ensures there is a space between the two parts 13, 15 of the capacitor 14. If the anchor 1 becomes displaced in an anchoring hole 2 in the direction of a mouth of the hole, a spacing between the two parts 13, 15 of the capacitor 14 becomes larger and the capacitance of the capacitor 14 decreases or at least changes. The position sensor holder 4 with the other part 15 of the capacitor 14 is fixed in the anchoring hole and does not move together with the anchor 1 in the event of the latter's becoming displaced in the direction of a mouth of the hole. The displacement of the anchor 1 can be measured by measuring the capacitance of the capacitor 14. For example, a charging or discharging time of the capacitor 14 is measured.

To avoid repetitions, for explanation of FIG. 4 reference will additionally be made to the explanatory comments made in connection with FIGS. 1 to 3. In FIG. 4 the same elements have been given the same reference numerals as in FIGS. 1 to 3. The capacitor 14 with its two parts 13, 15 forms an electrical position sensor of the anchor 1 with the position sensor holder 4 mounted on one of its ends.

LIST OF REFERENCE SIGNS

1 anchor
2 anchoring hole
3 anchoring substrate
4 position sensor holder
5 curing or cured composition
6 holding elements
7 barb
8 counter-contact
9 contact
10 further counter-contact
11 cable channel
12 cable
13 part of the capacitor 14
14 capacitor
15 other part of the capacitor 14
16 stop
17 position sensor
18 cap

The invention claimed is:

1. An arrangement of an anchor in an anchoring hole in an anchoring substrate, wherein in the anchoring hole there is arranged an electrical position sensor relative to which the anchor moves if the anchor moves in a direction out of the anchoring hole, wherein the position sensor is arranged in the anchoring hole in contact with an end face of the anchor that is located in the anchoring hole, wherein the anchor and the position sensor are fixed in the anchoring hole with a cured composition, and wherein the anchor has a position sensor holder which holds the position sensor movably or releasably on the anchor and/or against movement together with the anchor in a longitudinal direction of the anchoring hole.

2. The arrangement according to claim 1, wherein the anchor has at least one electrical contact and the position sensor has at least one electrical counter-contact which moves into or out of electrically conducting contact with the contact of the anchor in the event of a movement of the anchor in a direction out of the anchoring hole.

3. The arrangement according to claim 2, wherein the position sensor has a plurality of electrical counter-contacts which are arranged one after the other in the longitudinal direction of the anchoring hole.

4. The arrangement according to claim 1, wherein the anchor has a part of a capacitor and the position sensor has another part of the capacitor, the capacitance of which changes in the event of a movement of the anchor in the longitudinal direction of the anchoring hole.

5. The arrangement according to claim 1, wherein the position sensor holder holds the position sensor so that it does not move together with the anchor when the anchor moves out of the anchoring hole.

6. The arrangement according to claim 1, wherein the position sensor holder is positioned at a front end of the anchoring hole in a direction of introduction of the anchor into the anchoring hole.

7. The arrangement according to claim 1, wherein the position sensor holder and the anchor are separable from each other.

8. A fixing system having an anchor for an anchoring in an anchoring hole in an anchoring substrate and having a position sensor holder which holds an electrical position sensor movably or releasably on the anchor, wherein the position sensor holder is arranged on a common axis with the anchor and projects radially beyond the anchor.

9. The fixing system according to claim 8, wherein the position sensor holder has a cap which is mountable on an end of the anchor.

10. The fixing system according to claim 8, wherein the position sensor holder has holding elements which project radially beyond the anchor for holding the position sensor holder in an anchoring hole.

11. The fixing system according to claim 8, wherein the position sensor holder has a cable channel, which runs in a longitudinal direction alongside the anchor, for contacting the electrical position sensor of the position sensor holder outside an anchoring hole.

12. An arrangement of an anchor in an anchoring hole in an anchoring substrate, wherein in the anchoring hole there is arranged an electrical position sensor relative to which the anchor moves if the anchor moves in a direction out of the anchoring hole, wherein the anchor has at least one electrical contact and the position sensor has at least one electrical counter-contact which moves into or out of electrically conducting contact with the contact of the anchor in the event of a movement of the anchor in a direction out of the anchoring hole.

* * * * *